United States Patent
Botura et al.

(10) Patent No.: US 11,130,559 B2
(45) Date of Patent: Sep. 28, 2021

(54) HEATED PANELS WITH BALLISTIC STRUCTURES

(71) Applicant: Goodrich Corporation, Charlotte, NC (US)

(72) Inventors: Galdemir Cezar Botura, Akron, OH (US); Chris Cojocar, Uniontown, OH (US); Anthony Paul Digiacomo, Hartville, OH (US); Robert Dodson, Copley, OH (US)

(73) Assignee: Goodrich Corporation, Charlotte, NC (US)

( * ) Notice: Subject to any disclaimer, the term of this patent is extended or adjusted under 35 U.S.C. 154(b) by 200 days.

(21) Appl. No.: 15/999,419

(22) Filed: Aug. 20, 2018

(65) Prior Publication Data

US 2020/0055582 A1 Feb. 20, 2020

(51) Int. Cl.
*H05B 1/02* (2006.01)
*B64C 1/18* (2006.01)
*F24D 13/02* (2006.01)
*F24D 19/10* (2006.01)

(52) U.S. Cl.
CPC .............. *B64C 1/18* (2013.01); *F24D 13/024* (2013.01); *F24D 19/1096* (2013.01); *H05B 1/0236* (2013.01); *H05B 2203/026* (2013.01)

(58) Field of Classification Search
CPC ...... B64C 1/18; F24B 13/024; F24B 19/1906; H05B 1/0236; H05B 3/0042; H05B 2203/026
USPC ....... 219/203, 213, 483, 786, 543, 544, 546, 219/545
See application file for complete search history.

(56) References Cited

U.S. PATENT DOCUMENTS

| | | | |
|---|---|---|---|
| 6,194,692 B1 * | 2/2001 | Oberle | H05B 3/34 219/528 |
| 6,834,159 B1 | 12/2004 | Schramm | |
| 7,291,815 B2 * | 11/2007 | Hubert | B64D 15/12 219/535 |
| 7,557,330 B2 | 7/2009 | Shearer | |
| 7,799,710 B1 | 9/2010 | Tan | |
| 9,100,994 B2 * | 8/2015 | Orawetz | H05B 3/36 |
| 9,133,714 B2 * | 9/2015 | Vontell | F01D 5/147 |

(Continued)

FOREIGN PATENT DOCUMENTS

| | | |
|---|---|---|
| EP | 3095690 A2 | 11/2016 |
| KR | 2018/0035322 A | 4/2018 |
| WO | 01017850 A1 | 3/2001 |

OTHER PUBLICATIONS

Extended European Search Report dated Jan. 3, 2020, issued during the prosecution of European Patent Application No. EP 19192515.5.

*Primary Examiner* — Mark H Paschall
(74) *Attorney, Agent, or Firm* — Locke Lord LLP; Joshua L. Jones; Gabrielle L. Gelozin

(57) ABSTRACT

A heater panel includes a face layer. A heater/dielectric layer includes a heater layer between a pair of dielectric layers. The face layer is bonded to a first one of the dielectric layers. A ballistic structure is bonded to a second one of the dielectric layers. The face layer can be bonded directly to the first one of the dielectric layers with a film adhesive. The ballistic structure can be bonded directly to the second one of the dielectric layers with a film adhesive. The ballistic structure can be configured to withstand at least a 5.56 mm bullet impact.

14 Claims, 1 Drawing Sheet

(56) References Cited

U.S. PATENT DOCUMENTS

| | | |
|---|---|---|
| 9,914,522 B2 | 3/2018 | Nehring |
| 10,134,502 B2 * | 11/2018 | Elverud ................ H05B 3/145 |
| 10,457,405 B1 * | 10/2019 | Hardman ............... H05B 3/286 |
| 10,464,680 B2 * | 11/2019 | Kinlen .................. H01B 1/122 |
| 2006/0138279 A1 | 6/2006 | Pisarski |
| 2011/0290786 A1 * | 12/2011 | Hu ........................ B64D 33/02 |
| | | 219/544 |
| 2016/0340020 A1 | 11/2016 | Owens et al. |
| 2017/0303381 A1 * | 10/2017 | Wang ..................... A61N 1/44 |

* cited by examiner

HEATED PANELS WITH BALLISTIC STRUCTURES

BACKGROUND OF THE INVENTION

1. Field of the Invention

The present disclosure relates to heated panels, and more particularly to heated panels for use in aircraft for freezing protection and/or cabin comfort.

2. Description of Related Art

Cabin floor and side panels may require freezing protection to avoid ice formation and to provide for the comfort of crew and passengers. One traditional solution is to include resistive heating elements in floor and/or side panels to that the panels can be activated to provide heat.

The conventional techniques have been considered satisfactory for their intended purpose. However, there is an ever present need for improved heated panels. This disclosure provides a solution for this need.

SUMMARY OF THE INVENTION

A heater panel includes a face layer. A heater/dielectric layer includes a heater layer between a pair of dielectric layers. The face layer is bonded to a first one of the dielectric layers. A ballistic structure is bonded to a second one of the dielectric layers.

The face layer can be bonded directly to the first one of the dielectric layers with a film adhesive. The ballistic structure can be bonded directly to the second one of the dielectric layers with a film adhesive.

The ballistic structure can be configured to withstand at least a 5.56 mm bullet impact. The ballistic structure can include at least one of a ceramic material, a Kevlar® weave, steel, and/or ballistic polyethylene. The heater layer can include at least one of a wire heater, an etched conductor, carbon allotropes, and/or a positive thermal coefficient (PTC) material. The face layer can include at least one of a monolithic metal, a monolithic polymer, a resin-impregnated metal, and/or a resin-impregnated polymer fabric.

An aircraft includes an airframe and a heater panel as described above assembled to an interior of the airframe. The heater panel can be assembled to the interior of the airframe as a load bearing structural element. The heater panel can be assembled to the interior of the airframe as a load bearing floor panel. The aircraft can be devoid of non-structural ballistic floor mats overlying the floor panel.

A method of making a heater panel includes bonding face layer to a first dielectric layer of a heater/dielectric layer, wherein the heater/dielectric layer includes a heater layer between the first dielectric layer and a second dielectric layer. The method includes bonding a ballistic structure to the second dielectric layer.

Bonding the face layer to the first dielectric layer can include using a film adhesive to bond the face layer directly to the first dielectric layer. Bonding the ballistic structure to the second dielectric layer can include using a film adhesive to bond the ballistic structure directly to the second dielectric layer.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
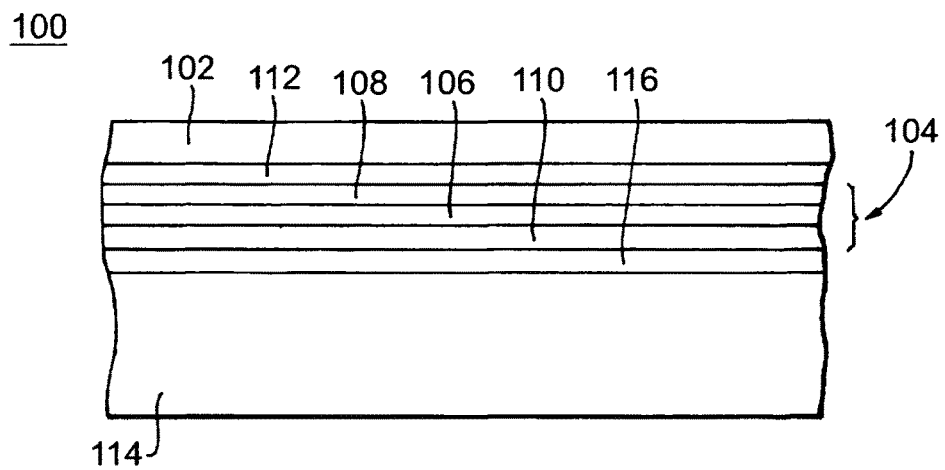
FIG. 1 is a schematic cross-sectional elevation view of an exemplary embodiment of a heater panel constructed in accordance with the present disclosure, showing the ballistic structure bonded to the heater/dielectric layer.

Reference will now be made to the drawings wherein like reference numerals identify similar structural features or aspects of the subject disclosure. For purposes of explanation and illustration, and not limitation, a partial view of an exemplary embodiment of a heater panel in accordance with the disclosure is shown in FIG. 1 and is designated generally by reference character 100. Other embodiments of heater panels in accordance with the disclosure, or aspects thereof, are provided in FIG. 2, as will be described. The systems and methods described herein can be used to provide both heat and protection from ballistics, e.g., in aircraft.

The heater panel 100 includes a face layer 102. A heater/dielectric layer 104 includes a heater layer 106 between a pair of dielectric layers 108 and 110. The face layer 102 is bonded directly to a first one of the dielectric layers, i.e., dielectric layer 108 using a film adhesive 112. A ballistic structure 114 is bonded directly to a second one of the dielectric layers, i.e., dielectric layer 110, using a film adhesive 116.

The ballistic structure 114 is configured to withstand at least a 5.56 mm bullet impact. The ballistic structure 114 includes at least one of a ceramic material, a Kevlar® weave (Kevlar® products are available from DuPont of Wilmington, Del.), steel, and/or ballistic polyethylene. The heater layer 106 includes at least one of a wire heater, an etched conductor, carbon allotropes, and/or a positive thermal coefficient (PTC) material. The face layer 102 provides impact resistance, e.g. so the heater panel 100 can be used as a floor, side panel, or ceiling panel in an aircraft or other vehicle or structure, wherein the face layer 102 withstands the impact of objects dropped on the floor of the aircraft, for example. The face layer 102 includes at least one of a monolithic metal, a monolithic polymer, a resin-impregnated metal, and/or a resin-impregnated polymer fabric.

Figure 2:
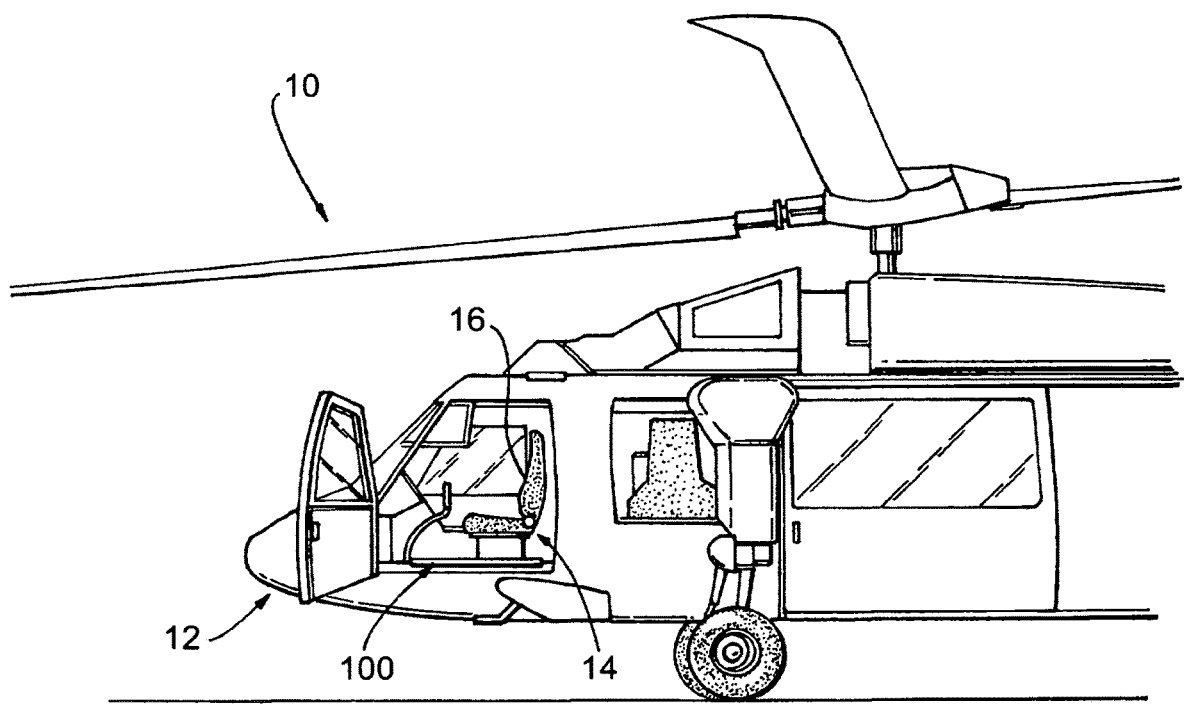
FIG. 2 is a schematic view of the heater panel of FIG. 1, showing the heater panel assembled into an airframe of an aircraft as a load bearing floor panel.

With reference now to FIG. 2, an aircraft 10 includes an airframe 12 and a heater panel 100 as described above is assembled to an interior 14 of the airframe 12. The heater panel 100 is assembled to the interior 14 of the airframe 12 as a load bearing structural element. As shown in FIG. 2, the heater panel 100 is assembled to the interior 14 of the airframe 12 as a load bearing floor panel, e.g., supporting the load 16, however those skilled in the art will readily appreciate that a heater panel 100 can be assembled into walls, ceilings, or other structural elements of the airframe 12 without departing from the scope of this disclosure. The aircraft 10 is devoid of non-structural ballistic floor mats overlying the floor panel 100. While FIG. 2 shows a helicopter, those skilled in the art will readily appreciate that any suitable aircraft, rotary wing, fixed wing, tilt wing, tilt motor, or the like can be used without departing from the scope of this disclosure.

Traditional techniques may include a heated floor panel which is then covered by a floor mat that includes a ballistic structure to protect occupants from ballistics. The heater panel 100 disclosed herein provides potential advantages over traditional techniques including having the heater element closer to the interior surface (rather than covering the heater with a mat), which improves the heat transfer and reduces the power required to protect the interior surface from icing and the like. The overall panel is also improved relative to traditional heater panels in terms of robustness, since use of the ballistic structure 114 improves the impact resistance on the heater panel 100 due to the increase of stiffness on the back of the structure of the heater panel 100.

The methods and systems of the present disclosure, as described above and shown in the drawings, provide for heater panels with superior properties including robustness, thermal efficiency, and protection against ballistics. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A heater panel comprising:
   a face layer;
   a heater/dielectric layer including a heater layer between a pair of dielectric layers, wherein the face layer is bonded to a first one of the dielectric layers; and
   a ballistic structure bonded to a second one of the dielectric layers,
   wherein the dielectric layers are separate and spaced apart from one another across the heater layer, wherein the dielectric layers are bonded directly to the heater layer, wherein the heater layer includes at least one of: an etched conductor, carbon allotropes, and/or a positive thermal coefficient (PTC) material, wherein the face layer includes at least one of a monolithic metal, a monolithic polymer, wherein the ballistic structure is configured to withstand at least a 5.56 mm bullet impact.

2. The heater panel as recited in claim 1, wherein the face layer is bonded directly to the first one of the dielectric layers with a film adhesive.

3. The heater panel as recited in claim 1, wherein the ballistic structure is bonded directly to the second one of the dielectric layers with a film adhesive.

4. The heater panel as recited in claim 1, wherein the ballistic structure includes at least one of a ceramic material, a Kevlar® weave, steel, and/or ballistic polyethylene.

5. An aircraft comprising:
   an airframe; and
   a heater panel assembled to an interior of the airframe, the heater panel including:
   a face layer;
   a heater/dielectric layer including a heater layer between a pair of dielectric layers, wherein the face layer is bonded to a first one of the dielectric layers; and
   a ballistic structure bonded to a second one of the dielectric layers,
   wherein the dielectric layers are separate and spaced apart from one another across the heater layer, wherein the dielectric layers are bonded directly to the heater layer, wherein the heater layer includes at least one of: an etched conductor, carbon allotropes, and/or a positive thermal coefficient (PTC) material, wherein the face layer includes at least one of a monolithic metal, a monolithic polymer, wherein the ballistic structure is configured to withstand at least a 5.56 mm bullet impact.

6. The aircraft as recited in claim 5, wherein the heater panel is assembled to the interior of the airframe as a load bearing structural element.

7. The aircraft as recited in claim 6, wherein the heater panel is assembled to the interior of the airframe as a load bearing floor panel.

8. The aircraft as recited in claim 7, wherein the aircraft is devoid of non-structural ballistic floor mats overlying the floor panel.

9. The aircraft as recited in claim 5, wherein the face layer is bonded directly to the first one of the dielectric layers with a film adhesive.

10. The aircraft as recited in claim 5, wherein the ballistic structure is bonded directly to the second one of the dielectric layers with a film adhesive.

11. The aircraft as recited in claim 5, wherein the ballistic structure includes at least one of a ceramic material, a Kevlar® weave, steel, and/or ballistic polyethylene.

12. A method of making a heater panel comprising:
   bonding face layer to a first dielectric layer of a heater/dielectric layer, wherein the heater/dielectric layer includes a heater layer between the first dielectric layer and a second dielectric layer; and
   bonding a ballistic structure to the second dielectric layer, wherein the dielectric layers are separate and spaced apart from one another across the heater layer, wherein the dielectric layers are bonded directly to the heater layer,
   wherein the heater layer includes at least one of: an etched conductor, carbon allotropes, and/or a positive thermal coefficient (PTC) material, wherein the face layer includes at least one of a monolithic metal, a monolithic polymer, wherein the ballistic structure is configured to withstand at least a 5.56 mm bullet impact.

13. The method as recited in claim 12, wherein bonding the face layer to the first dielectric layer includes using a film adhesive to bond the face layer directly to the first dielectric layer.

14. The method as recited in claim 12, wherein bonding the ballistic structure to the second dielectric layer includes using a film adhesive to bond the ballistic structure directly to the second dielectric layer.

* * * * *